(12) United States Patent  (10) Patent No.: US 8,714,479 B1
Chapman  (45) Date of Patent: May 6, 2014

(54) CENTERING, RELEASE AND RESET MECHANISM

(75) Inventor: Douglas M. Chapman, Santa Ana, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 167 days.

(21) Appl. No.: 13/208,312

(22) Filed: Aug. 11, 2011

(51) Int. Cl.
    *B64C 3/38*     (2006.01)
    *B64C 5/10*     (2006.01)
    *B64C 9/00*     (2006.01)
    *B64C 13/00*    (2006.01)

(52) U.S. Cl.
    USPC ........................................................ 244/99.3

(58) Field of Classification Search
    USPC ................... 244/99.3, 194, 131, 75.1, 34 R
    See application file for complete search history.

(56) References Cited

U.S. PATENT DOCUMENTS

| | | | |
|---|---|---|---|
| 2,809,736 A | * | 10/1957 | Hoover ........................ 192/143 |
| 3,695,096 A | | 10/1972 | Kutsay |
| 4,159,444 A | | 6/1979 | Bartlett et al. |
| 4,594,714 A | | 6/1986 | Fischer et al. |
| RE32,746 E | | 9/1988 | Nelson |
| 4,782,706 A | | 11/1988 | Kister |
| 5,114,096 A | | 5/1992 | Wernicke |
| 5,719,566 A | | 2/1998 | Readman et al. |
| 6,011,482 A | | 1/2000 | Banks |
| 6,140,942 A | | 10/2000 | Bragg |
| 6,239,713 B1 | | 5/2001 | Harvey |
| 6,389,915 B1 | | 5/2002 | Wngett |
| 6,622,972 B2 | | 9/2003 | Urnes et al. |
| 6,636,009 B2 | | 10/2003 | Walter |
| 6,672,540 B1 | | 1/2004 | Shaheen |
| 7,299,702 B2 | | 11/2007 | Gibert |
| 2006/0170535 A1 | | 8/2006 | Watters |

* cited by examiner

*Primary Examiner* — Valentina Xavier
(74) *Attorney, Agent, or Firm* — Donna P. Suchy; Daniel M. Barbieri (57) ABSTRACT

The mechanism includes a primary load path element having at least one slot. A pin-key within the primary load path element slot allows freedom of movement in a rotational direction orthogonal to a positioning direction. A secondary load path element includes at least one secondary load path element slot. A key is positioned between the load path elements. A compression cam is positioned within an opening in the secondary load path element that defines a grooved cam seat. A tension cam is positioned within the opening in the secondary load path element. The tension cam has a defined pivot and stop. A cam follower rests on lobe surfaces of the cams. The cam follower applies a preload force to both cams opposing the cam's rotation. A push rod is seated in a hole in the cam follower and extends through a respective hole in the secondary load path element.

15 Claims, 11 Drawing Sheets

CENTERING, RELEASE AND RESET MECHANISM

BACKGROUND OF THE INVENTION

1. Field of the Invention

The present invention relates generally to a positioning and release mechanism between two elements currently used in aircraft actuation systems, and more particularly to a dual load path fail-safe actuation system designed to shift the supported load from the primary load path to the secondary structures at a predetermined force load on the secondary structure.

2. Description of the Related Art

Modern aircraft have horizontal stabilizers located at the rear tail section of the fuselage or the forward section that are pivotally supported relative to the airplane fuselage to "trim" the aircraft during flight by selective adjustment by the operator or auto-pilot from an internal control unit. The stabilizer actuator is a variable length structural link connecting the horizontal stabilizer control surface to the fuselage structure and used to control the pitch (attitude) of the aircraft during takeoff, cruise and landing phases under different aerodynamic loading conditions. The horizontal stabilizer actuator is also used to recover the aircraft during severe aircraft stall situations. In this regard the stabilizer is traditionally connected to the rear section (or tail section) or forward section of the fuselage between a pivot and a position control actuator.

One common trimable horizontal stabilizer actuator consists of a primary ball nut assembly connected with an actuating drive gimbal which is pivotally connected to one end of the horizontal stabilizer structure. The ball nut assembly includes the ball nut housing and is positioned by a rotating ball screw extending axially and usually vertically through the ball nut housing to move a drive gimbal. The ball nut housing is connected to the drive gimbal by means of a trunion, and this translating gimbal is connected to the attachment structure of the horizontal wing. The ball screw, in turn, has one end remote from the actuating drive that contains an extend stop, while a retract stop is located near the driving gearbox and noback assembly which in turn has a gimbal that is fixed from translation or axial movement by a connection to the structure of the vertical stabilizer or fuselage. As the ball screw is rotated, the drive gimbal will be moved in translation relative to it and the fixed attachment. Thus as the ball screw is rotated in one direction, the leading edge of the horizontal stabilizer is pivoted upward, whereas by rotating the ball screw in the other direction, the leading edge of the horizontal stabilizer is pivoted downward achieving the desired horizontal stabilizer angle. Rotation of the ball screw is routinely done by a motor (electric or hydraulic, depending on system architecture) and associated gearing which is connected to the second, fixed support gimbal and which is actuated by the operator or pilot by the internal control unit. The connection of the stabilizer actuator to the stabilizer is located within the vertical stabilizer or fuselage tail section and not directly in the air stream.

The horizontal stabilizer movement, as controlled by the operator or auto-pilot, is transmitted by the ball screw through the actuating drive gimbal by way of the primary ball nut and ball screw plus primary gimbals which defines a primary load path from the wing attachment to the fixed attachment. The movement has a load with a tensile or compressive component as well as a torque component due to the ball screw thread lead. Failures of the primary load path such as caused by the shearing off of the connecting trunion segment, ball screw disconnect or by the loss of nut ball members from the ball nut assembly can result in the complete loss of control of the primary load path, resulting in the loading of the secondary load path. Absent a secondary load path, the failure would be catastrophic to the aircraft. However, stabilizer actuators are normally required to be provided with a secondary load path for alternate support of the stabilizer load. This provides structural integrity as well as meeting the required level of safety. In such structures, the primary load path is normally controllably actuated by the operator or flight computer avionics and is thus under load while the secondary load path is normally designed with gaps that prevent shared loading such that the secondary load path is in a standby mode. In the event of a primary load path failure, the secondary load path is automatically mobilized whereby the stabilizer actuator is jammed in position by means of locks (such as by a tie-rod lock or a secondary inverted nut lock) and rendering the actuator no longer controllable by the operator, pilot or auto-pilot to move the stabilizer. The transfer of support to the secondary load path can occur quite rapidly whereby failure of the primary load path is detected by the operator or pilot by means of the jammed actuator.

The overall design is normally required to leave the engaged secondary load path and jammed actuator with a sufficiently small axial backlash which in the event of repeated load inversions that could enter into an oscillatory mode will not cause deterioration of the wing structure or its connections. Excessive oscillations could cause a catastrophic failure condition for the wing or other aircraft structures. Recent FAA requirements have resulted in additional deflections in the wings attachment between the primary and secondary moving attachments. Because of these new FAA changes, earlier methods, present art, have not been adequate to address this additional deflection during normal operations when the primary load path is intact. The present invention offers a method and solution for allowing sufficiently large gaps between the primary load path and the secondary load path components to prevent load sharing between the two paths during normal operating conditions (primary load path intact). Yet, when the primary load path has failed and the secondary load path is engaged the present bidirectional locking mechanism will trigger minimizing the axial backlash of the secondary load path to allowable levels assuring the actuator in the secondary load path condition is unaffected by an excessive oscillatory mode condition as previously described.

SUMMARY OF THE INVENTION

In a broad aspect, the present invention is a centering, release and reset mechanism includes a primary load path element operatively connected to a positioning structure, the primary load path element having at least one primary load path element slot. A pin-key is positioned within the primary load path element slot and arranged and constructed to allow freedom of movement in a rotational direction orthogonal to a positioning direction. A secondary load path element includes at least one secondary load path element slot. A key or spline is positioned between the secondary load path element and the primary load path element. A compression cam is positioned within an opening in the secondary load path element. The opening defines a grooved cam seat for permitting the compression cam to have a defined pivot and stop. A tension cam is positioned within the opening in the secondary load path element. Rotation of the tension cam is permitted in the same rotary direction of the compression cam, but they are operated by opposite direction loads from the pin-key. Both cams have a defined pivot and stop to features of the secondary inverted nut housing. A cam follower rests on respective lobe surfaces of the compression cam and the tension cam. The cam follower has a preload force against rotation against either cam. A push rod is seated in a hole in the cam follower and extends through a hole in the secondary load path element. A leaf spring assembly includes a spring carrier piloted on an end of the secondary load path element; and, leaf springs carried by the spring carrier and fastened to the secondary load path element. The leaf springs provide the preload force.

In a desired loaded, centered position a preload force from the cam follower is received by the stops on the compression cam and the tension cam. The pin-key is thereby captured and centered in the secondary load path element relative to the primary load path element's slot. A failure in a primary load path causes a load to be impressed between the pin-key and one of the cams and if the load is sufficiently high enough to overcome the preload force of the cam follower, then the cam will rotate allowing the pin-key to move in either the tension or compression direction. When the primary load path element and the secondary load path element are repositioned back to the centered position, then the cam follower rotates the cam back to its centered reset positions. The release and reset actions do not require the use of a shear pin.

The inventive concepts herein may be implemented an actuator system for an aircraft of a type having a primary aircraft structure, a secondary aircraft structure and a control surface, or horizontal stabilizer wing, also having primary and secondary attachments. The actuator is a variable link, motor driven per aircraft commands, and thereby positions the control surfaces primary attachment relative to the primary attachment in the fuselage or vertical stabilizer aircraft structures. The load path between the primary attachment at aircraft structure and the control surface's primary attachment defines the normal operation load path. These actuators are normally required to be a "dual load path" device, such that a secondary attachment exists at both the fuselage attachment and at the control surface. The design of the secondary load path within the actuator prevents loading on the secondary components while the primary load path is intact. In this broad aspect the actuator system, includes a) a stationary actuator assembly; b) a ball screw assembly; c) a tie-rod assembly positioned within the ball screw assembly; and, d) a translating actuator assembly.

The stationary actuator assembly, comprises: i) a stationary actuator assembly housing; ii) a gear assembly supported by the stationary actuator assembly housing; iii) at least one motor assembly operatively associated with the gear assembly; and, iv) a stationary primary gimbal assembly mounted to the stationary actuator assembly housing, the stationary primary gimbal assembly being securely connected to a primary aircraft structure.

The ball screw assembly is operatively connected to the gear assembly. The ball screw assembly, includes: i) a ball screw; ii) a ball nut assembly translatable along the ball screw; the ball nut assembly including a plurality of ball circuits, each ball circuit containing a plurality of balls; iii) a secondary inverted thread nut housing in an unloaded standby mode operatively positioned about the ball nut assembly, the secondary inverted thread nut housing having a plurality of radially and axially spaced slots; iv) a positioning and release device (the subject of this invention); v) an extend mechanical stop positioned at an end of the ball screw opposite the stationary actuator assembly; and, vi) a retract mechanical stop at an opposite end of the ball screw near the gear housing.

The tie-rod assembly is positioned within the ball screw assembly, the tie-rod assembly being radially locked to the ball screw assembly at extremities thereof. The tie-rod assembly includes: i) a secondary clevis connected to a stationary secondary aircraft structure; ii) a secondary locking element operatively connected to the secondary clevis; and, iii) a tie-rod comprising a threaded end including a lock nut. The lock nut is connected to the tie-rod threaded end. A tie-rod secondary load path is defined from the secondary aircraft structure to the secondary clevis, to the locking element to the tie-rod and to the locking nut. The translating actuator assembly, includes: i) a translating primary gimbal assembly, connected to the primary ball nut; ii) a translating secondary gimbal assembly, connected to the aircraft's secondary wing attachment; iii) a translating clevis assembly, attached to the secondary gimbal and piloted by the secondary inverted nut housing; iv) at least two stationary major keys between the clevis and secondary inverted nut housing; v) an axial and radial tension lock assembly to lock the clevis to the secondary inverted nut housing upon failure of the primary load path in tension; vi) an axial and radial compression lock assembly to lock the clevis to the secondary inverted nut housing upon failure of the primary load path in compression; and, vii) at least two axial stop key elements. Each tension slide key assembly includes: a tension slide key; and, at least one spring mounted on the tension slide key and operatively connected to the translating clevis assembly. During intact primary load path operation up to the structural integrity load the tension slide key contacts an outer surface of the SITNH in stand-by mode unaffected and unengaged by relative deflections between the primary load path and the secondary load path; and, during failed primary load path operation the tension slide key engages in an associated slot in the SITNH minimizing axial play.

The axial and radial compression lock assembly includes at least one compression slide key assembly housed within the clevis assembly. Each compression slide key assembly, includes: a compression slide key; and, at least one spring mounted on the compression slide key and operatively connected to the translating clevis assembly, wherein during intact primary load path operation up to the structural integrity load the compression slide key contacts an outer surface of the SITNH in stand-by mode unaffected and unengaged by relative deflections between the primary load path and the secondary load path; and, during failed primary load path operation the compression slide key engages in an associated slot in the SITNH minimizing axial play.

The at least two retaining elements are securely attached to the translating clevis assembly for providing the operative connection between the translating clevis assembly and the translating secondary gimbal assembly.

A translating portion of the primary load path in compression and in tension directions is defined by the load from the ball screw to the ball nut assembly to the translating primary gimbal assembly to the control surface; wherein only the primary load path is loaded when intact.

A translating portion of the secondary load path in compression direction is defined by the load from the ball screw to the inverted split secondary ball nut to the SITNH to the compression slide key and the stationary major keys to the translating clevis assembly to the retaining elements to the translating secondary gimbal assembly to the control surface; wherein the secondary load path is unloaded, in stand-by, when the primary load path is intact in compression.

A translating portion of the secondary load path in tension direction is defined by the load from the ball screw to the inverted split secondary ball nut to the SITNH to the tension slide key and the stationary major keys to the translating clevis assembly to the retaining elements to the translating secondary gimbal assembly to the control surface; wherein the secondary load path is unloaded, in stand-by, when the primary load path is intact in tension.

The actuator locking mechanism is a bi-directional secondary lock that operates under both compression and tension loads via a radial locking wedge designed into the split secondary ball nut. This locking mechanism is designed to effectively protect against structural disconnect after a primary load path failure occurs. To avoid the dormancy of such a failure, the activated mechanism jams/stalls the actuator drive thereby alerting aircrew of the fault condition. This locking mechanism is impervious to relative deflection between the primary and secondary load path (i.e. stiffness contributions) such that under a non-failed condition, the mechanism will not jam due to the axial freedom designed into the tension and compression lock keys between the SITNH and the secondary clevis. A jam only occurs when the axial displacement is greater than a predetermined relative axial freedom, causing a stop pair of keys to engage. The makeup of this design also features a cageless roller implementation which captures the rollers within the features of the V-shaped ramp design built into the secondary inverted nut.

DETAILED DESCRIPTION OF THE INVENTION

Figure 1:
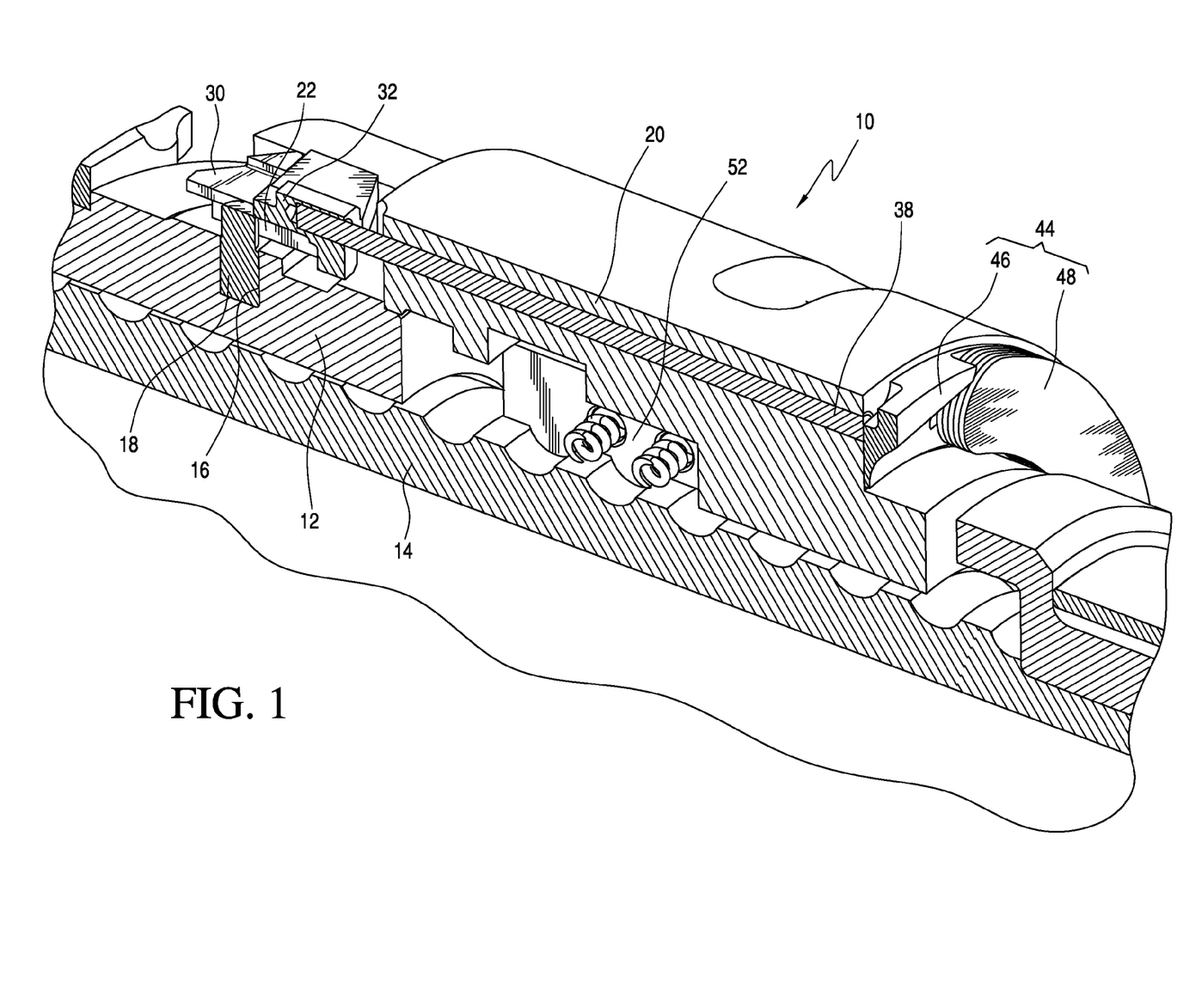
FIG. 1 is an orthogonal cutaway perspective view of the centering, release and reset mechanism of the present invention.

Referring now to the drawings and the characters of reference marked thereon, FIG. 1 illustrates the centering, release and reset mechanism, designated generally as 10, in accordance with the principles of the present invention, embodied for use with a horizontal stabilizer (not shown) of an aircraft. The mechanism 10 includes a primary load path element, i.e. primary ball nut 12, operatively connected to a positioning structure (not shown). In this horizontal stabilizer application, a ball screw 14 is connected to a noback and drive gearbox assembly (not shown), which in turn connects with a primary gimbal (not shown), which in turn, is connected to the aircraft's fuselage (not shown). The primary load path element (primary ball nut 12) has at least one slot 16, that is used by this release and reset mechanism as the position reference. Although the present invention is being described with respect to its application with the horizontal stabilizer wing of an aircraft, the invention can be used with other control structures, a flap system or landing gear. Furthermore, the inventive concepts herein are applicable to many other applications outside of aircraft applications where a centering device that provides positioning of two parts is required up to a predetermined load whereupon reaching this load the unit releases. Such applications may include, for example, a fail-safe actuator in a nuclear reactor that requires detecting the failure of a primary system.

A pin-key 18 is positioned within the primary load path element slot 16 and is arranged and constructed to allow freedom of movement in a rotational direction orthogonal to the positioning direction. The positioning direction is parallel to the axis of the primary ball nut 12.

Figure 2:
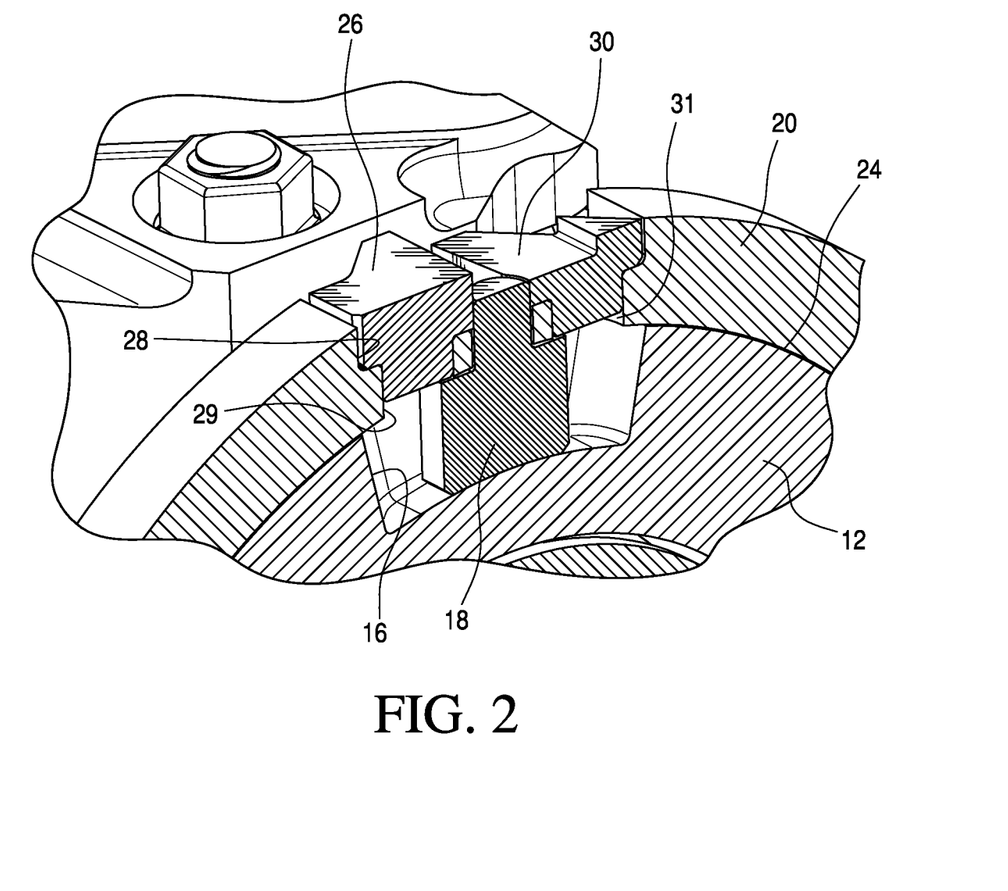
FIG. 2 is a cutaway perspective section through a pin-key of the mechanism of FIG. 1, showing surrounding cams, the section being orthogonal to the ball screw center line and at the center of the pin-key.

A secondary load path element (i.e. in this preferred embodiment, a secondary inverted nut housing 20) includes at least one secondary load path element slot 22 (see FIG. 6) to allow the pin-key 18 to protrude through, and space to axially move relative to the secondary load path element. Referring now to FIG. 2, a key or spline 24 is positioned between the secondary load path element 20 and the primary load path element 12 (spline teeth are not shown in the figure).

Figure 7:
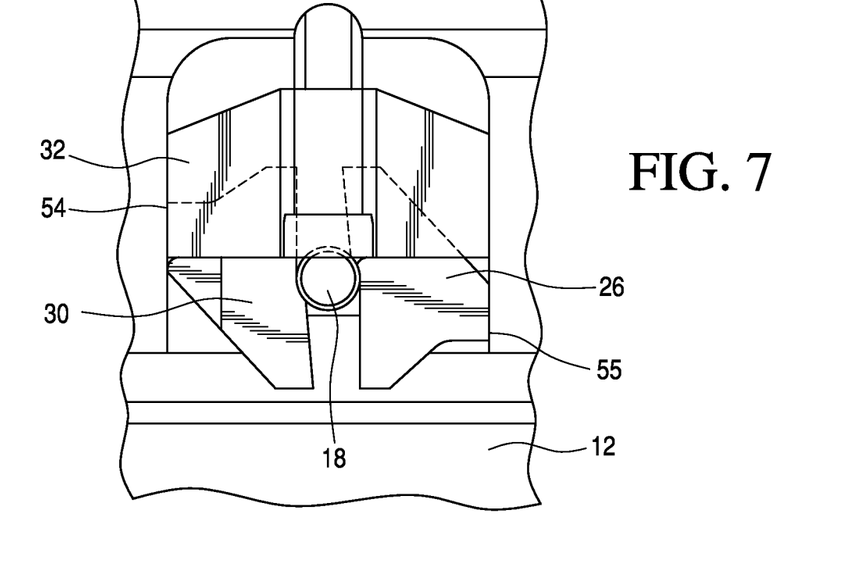
FIG. 7 is a view over the mechanism, which shows how the cams partially surround the cam follower pin from different sides.
Figure 8:
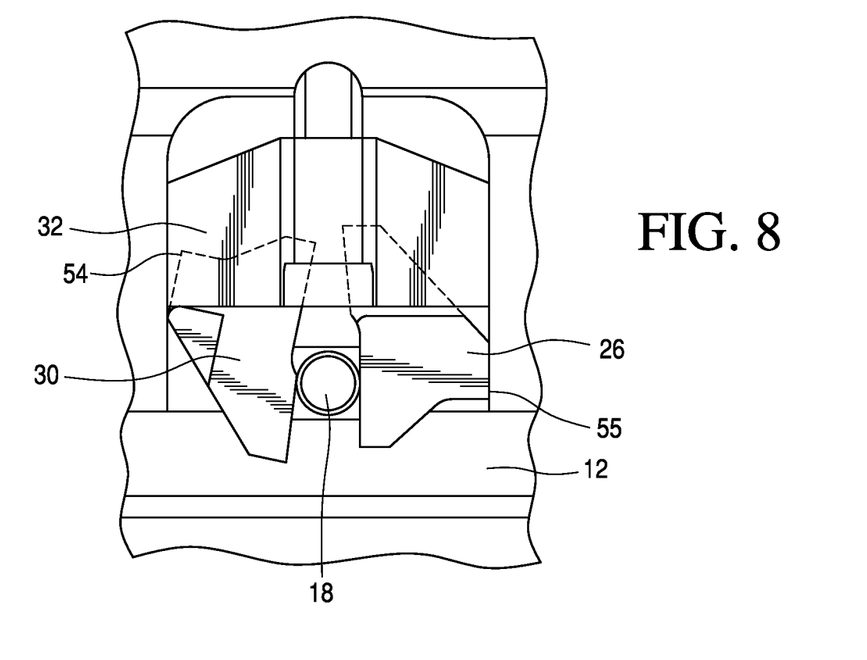
FIG. 8 is a view showing the pin-key having moved to the peak of the tension cam's lobe and having overcome the restraining force of the cam follower which is shown retreated.

A compression cam 26 is positioned within an opening in the secondary load path element 20 by means of a pivot hole in the secondary load path element. The opening defines a grooved cam seat 28 for permitting the compression cam 26 to have a defined pivot hole 29 and stop (as shown in FIGS. 2, 7 and 8).

Referring to FIG. 2, a tension cam 30 is positioned within the opening 28 in the secondary load path element 20 by means of a pivot hole 29 in the secondary load path element. Rotation of the tension cam 30 is permitted in the same rotary direction as the compression cam 26, but partially surrounds the pin-key on the side opposite the tension cam. The tension cam 30 also has a defined pivot hole 31 and stop located in the secondary load path element.

Figure 5:
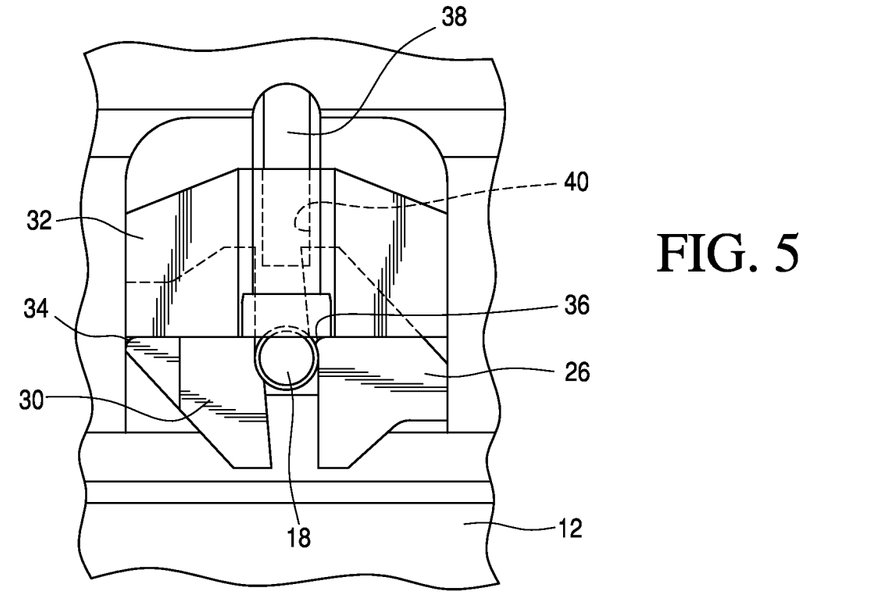
FIG. 5 is a view looking down along the axis of the pin-key with both cams visible.
Figure 6:
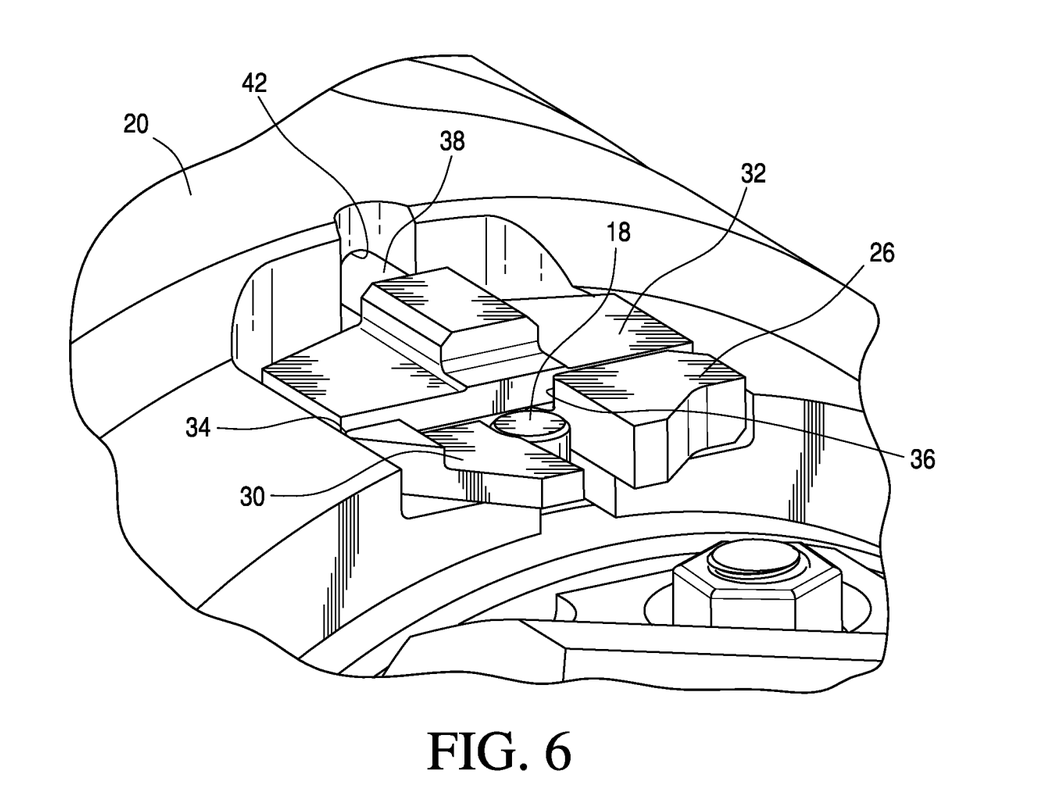
FIG. 6 is a view toward screw end (up in aircraft) showing the pin-key, both cams, and the cam follower in the normal position.

Referring best to FIGS. 5 and 6, a cam follower 32 rests on respective lobe surfaces 34 and 36 of the compression cam 26 and the tension cam 30. The cam follower 32 has a preload force supplied by the next described push rod, which preload force is applied to both cams as shown. The cam follower 32 rests on flat surfaces of both cams and is held in-place by means of the push rod 38. Clearance is provided at the top of the pin-key 18 to allow it to pass freely under the cam follower 32 upon a compression release.

A push rod 38 is seated in hole 40 in the cam follower 32 and extends through a respective hole 42 in the secondary load path element 20.

Referring again now to FIG. 1, a leaf spring assembly, designated generally as 44, includes a spring carrier 46 piloted on an end of the secondary load path element 20. The leaf spring assembly also includes a plurality of leaf springs 48 carried by the spring carrier 46 and fastened by cap screws 50 (see FIG. 14) to the secondary load path element 20. The leaf springs 48 provide the preload force that sets the release force level for the device. The spring carrier 46 may optionally be constructed to add some additional spring preload force. This preload force is passed through the secondary nut housing element by means of the push rod to the cam follower.

During operation, in a desired loaded and centered position, a preload force from the cam follower 32 is received by the stops on the compression cam 26 and the tension cam 30. The pin-key 18 is thereby captured and centered in the secondary load path element 20 relative to the primary load path element's slot 16 at a position between the two pivot holes in the secondary load path element which are used to pivot the two cams.

A failure in the actuator's primary load path that causes a load to be impressed between the pin-key 18 and one of the cams, depending on the load direction, will cause that cam to rotate if the load is sufficiently high enough to overcome the preload force of the cam follower 32. The rotated cam allows the pin-key 18 to move in either the tension or compression direction (see FIGS. 8 and 11), depending again on the load direction. In either direction case, the opposite cam has a straight surface parallel to the actuator's axis which absorbs the cam force from the pin-key 18 in a direction orthogonal to the positioning direction.

When the primary load path element 12 and the secondary load path element 20 are repositioned back to the centered position, then the cam follower 32 rotates the previously rotated cam back to its centered reset positions. This reset feature allows for a procedure to be optionally implemented that will check the operating release force level of the release mechanism, allowing the device to be reset back to the centered position without damage.

Unlike previous mechanisms, the release and reset actions do not require the use of a shear pin.

As can be seen in FIG. 1, the secondary nut housing 20 is positioned such that inverted threads of the secondary inverted nut 52 contained therein are positioned within a space of the ball screw thread of the ball screw 14, without touching flanks of the ball screw thread, under normal loading conditions, while the primary load path of the actuator (not shown) operatively connected to the ball screw is intact (not failed). Upon the release of the mechanism, due to any tension or compression loading that overcomes the preload force, the release and resulting axial movement initiating loading of the secondary inverted nut 52 causes actuator lockup and primary load path failure detection by the aircraft's electronics.

Figure 3:
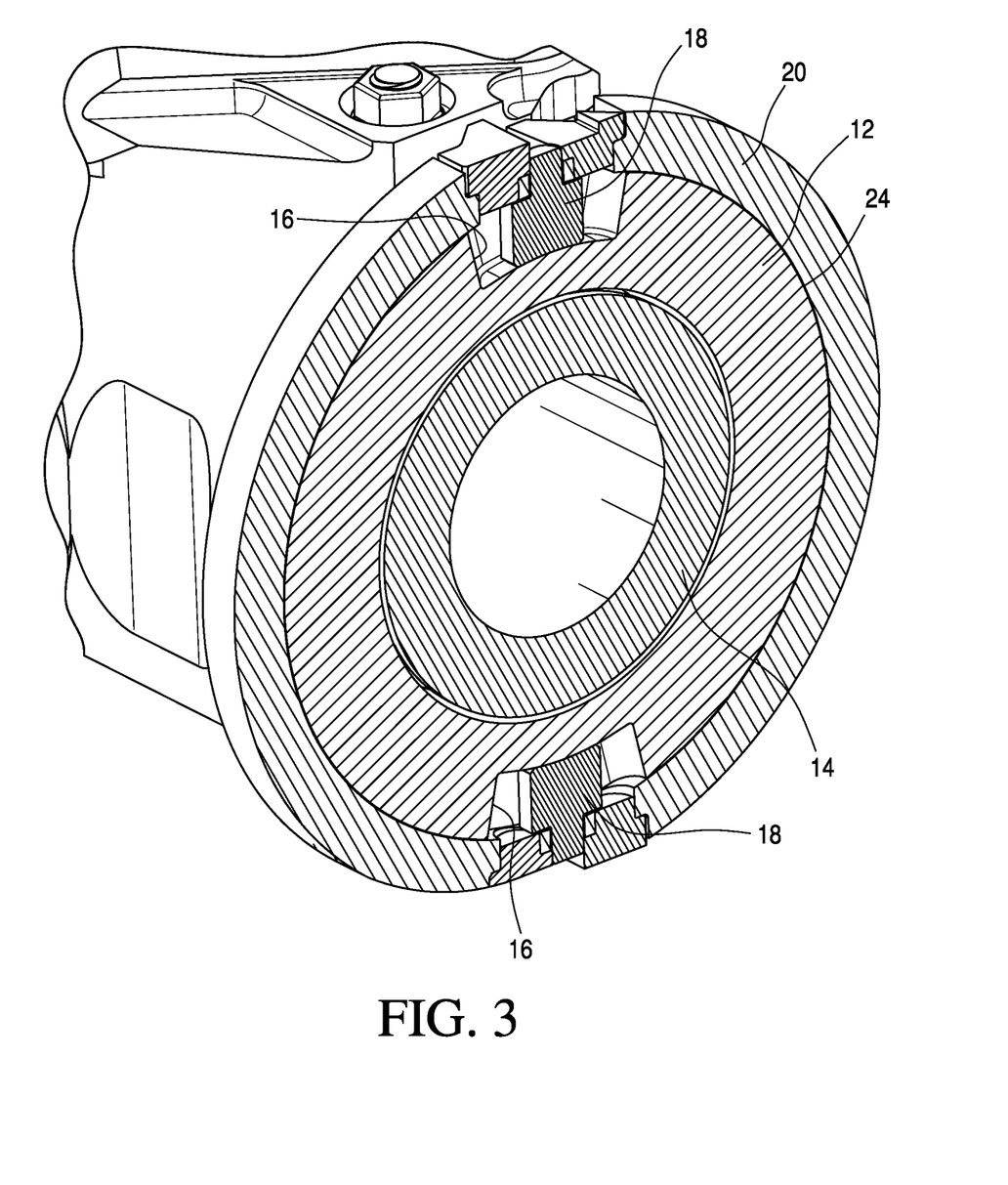
FIG. 3 is a same section as FIG. 2, but showing both pin-keys.

Referring now to FIGS. 2 and 3, the freedom of movement of the pin-key 18 in the rotational direction allows for a backlash of a rotational key or spline 24 located between the primary load path element and the secondary load path element. (Note that the spline 24 interface diameter is shown in the figures, but the spline teeth are not shown.)

As can be seen in FIG. 2, the pin-key 18, the compression cam 26, the tension cam 30, the cam follower 32, the push rod 38, and, the leaf spring assembly 44 collectively comprise a first set of functional elements. In this embodiment, a second set of such functional elements are positioned 180 degrees apart from the first set, around the axis of the positioning structure as shown in FIG. 3. Only one set of functional elements are required when the resulting offset loading in not a problem for the actuator. More than two sets may also optionally be employed providing a different spring preload force system is provided.

The tension cam 30 and the compression cam 26 are balanced with the same preload force by providing the same distance from each said lobe surface to the cam's center of rotation for both tension and compression cams. Optionally, this preload force can be made different by shortening or lengthening one of the lobe's distance to the rotation axis for one cam relative to the other cam as required meeting specific actuator requirements.

The release and reset mechanism 10 requires a small axial length of the primary ball nut 12 as compared to other known prior art methods of centering the secondary elements.

Figure 4:
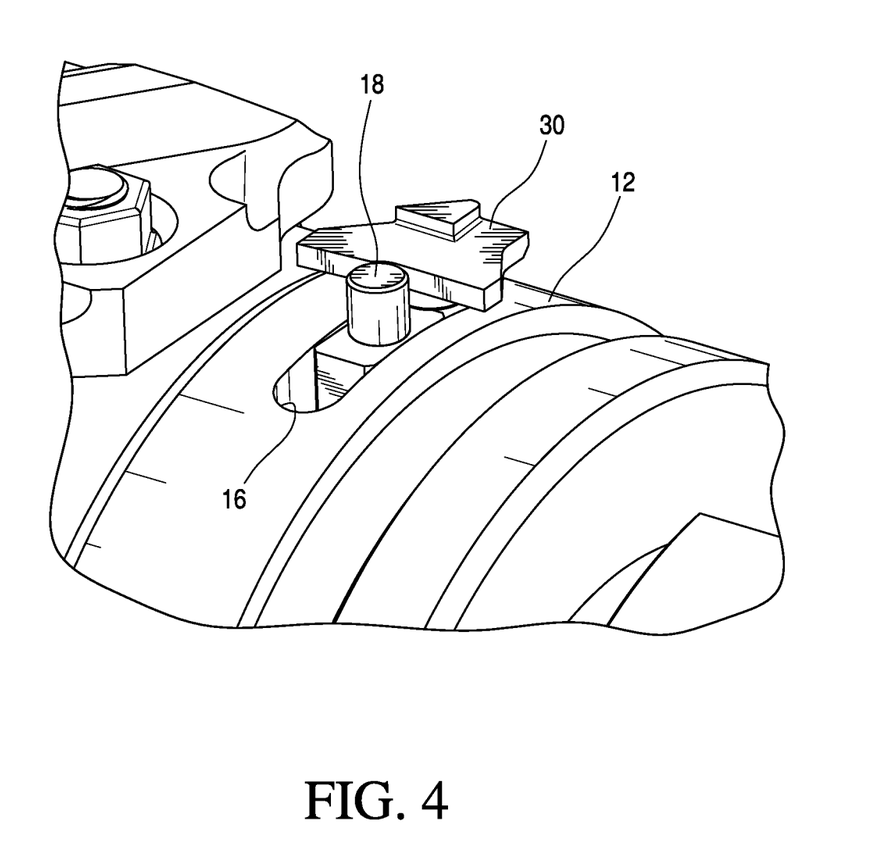
FIG. 4 is a close-up perspective view of one pin-key, with only the primary nut and the tension cam being shown.

FIG. 4 illustrates a close-up of one pin-key 18, with only the primary nut 12 and the tension cam shown. This close-up shows how the tension cam 30 partially wraps around the pin-key 18 applying its preload force to the pin-key 18.

FIG. 5 is a view looking down along the axis of the pin-key 18 with both cams 30, 26 visible. It illustrates that the preload forces are balanced at rest from both cams. Both cams provide geometrically similar lobes for the cam follower 32. There is no interference here since the pin-key 18 can travel under the cam follower 32. Only the fasteners 50 for the leaf springs 48 are required secure the mechanism to the housing (See FIG. 14).

FIG. 6 is a view toward screw end (up in aircraft) showing the pin-key 18, both cams 26, 30, and the cam follower 32 in the normal position. This figure shows how the pin-key 18 can move under the cam follower 32 upon compression loading primary failure. The push rod 38 transmits a spring force to the cam follower 32.

FIG. 7 is a view over the mechanism, which shows how the cams 26, 30 partially surround the cam follower pin from different sides. Both cams are only capable of rotating in the clockwise direction because of stops 54 against the housing seat. Each cam has a surface parallel with the housing axis that backs up the pin-key 18 against the loading from the opposite cam during movement in either direction.

FIG. 8 is a view showing the pin-key 18 having moved to the peak of the tension cam's lobe and having overcome the restraining force of the cam follower which is shown retreated, perhaps about 0.029 inches axially. The compression cam 26 backs up the pin-key 18 during a tension movement of the inverted nut housing 52. A tension load on the inverted nut 52 has caused this movement. This load must be large enough to overcome the preload force applied by the tension cams 30 to their respective pin-key 18. This same action will occur 180° apart on the housing.

Figure 9:
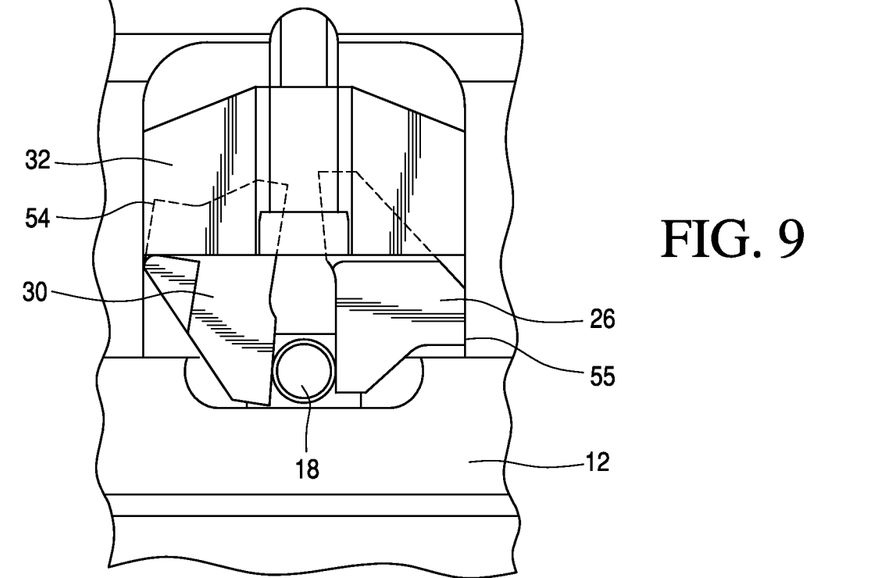
FIG. 9 is a view showing the pin-key having moved from the tension cam and having recovered some of its previous rotation, still putting pressure on the pin-key because of the force from the cam follower.

Referring now to FIG. 9, the pin-key 18 has now moved about 0.18 inches in this example (or designed as needed for a different travel) from the tension cam 30 and has recovered some of its previous rotation, still putting pressure on the pin-key 18 because of the force from the cam follower 32. The primary nut 12 and inverted nut housing 52 has moved axially while still engaged in the spline. The compression cam 26 is still backing up the pin-key 18 since it cannot rotate counterclockwise. The primary nut 12 has moved with the pin-key 18 because of the slot 16 (See also FIG. 2).

Figure 10:
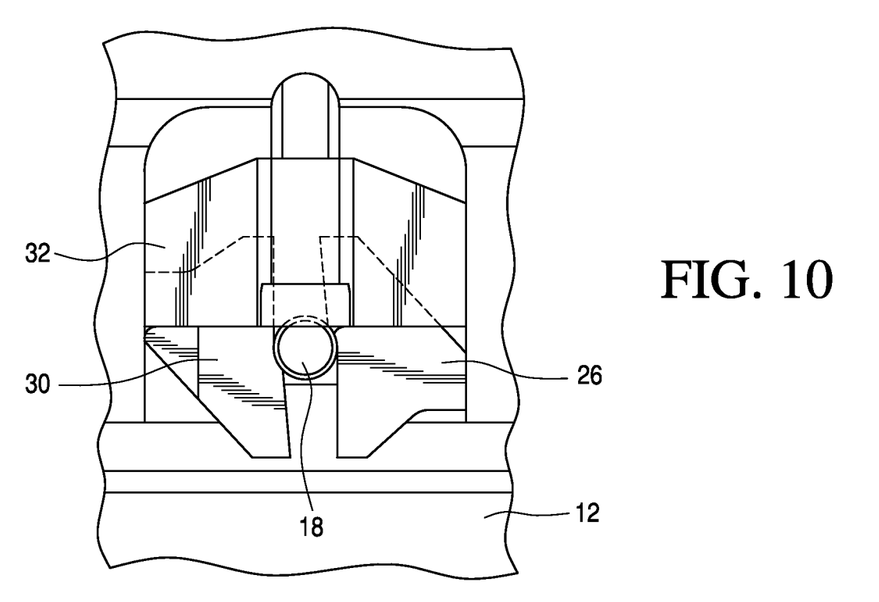
FIG. 10 shows the pin-key having moved back to the centered position.

In FIG. 10, the pin-key 18 has moved back to the centered position. The cam follower 32 has been amended in this figure.

Figure 11:
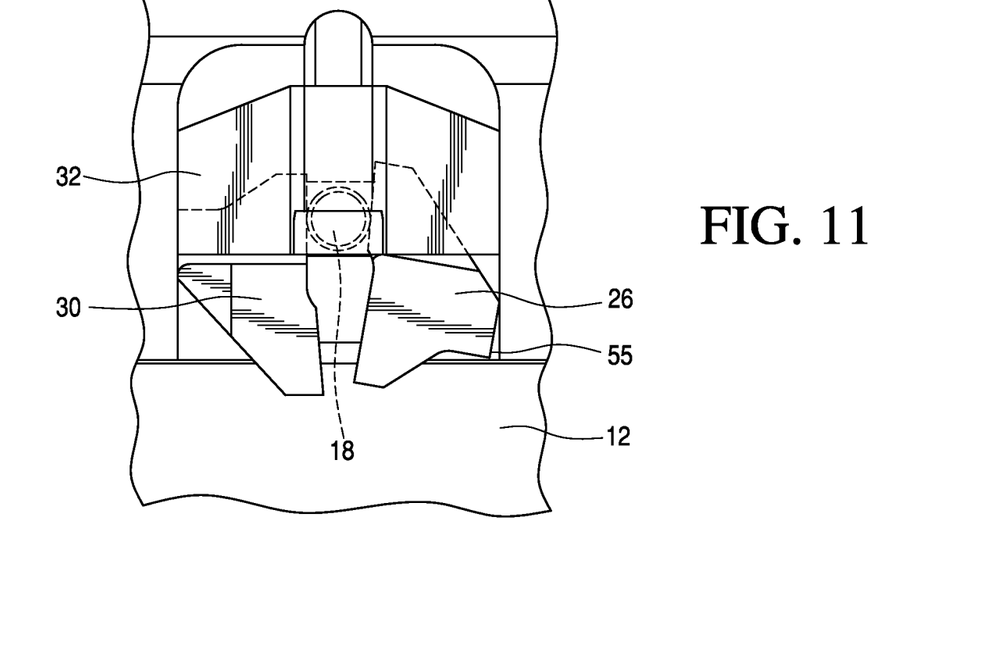
FIG. 11 shows the pin-key just past the peak of the compression cam's lobe, similar to the previous tension cam's movement, but now in the compression direction for the loading on the inverted nut and actuator.

Referring now to FIG. 11, the pin-key 18 is shown slightly past the peak of the compression cam's lobe, similar to the previous tension cam's movement, but now in the compression direction for the loading on the inverted nut 52 and actuator. In this position, it is the tension cam's job to backup the forces from the compression cam.

Figure 12:
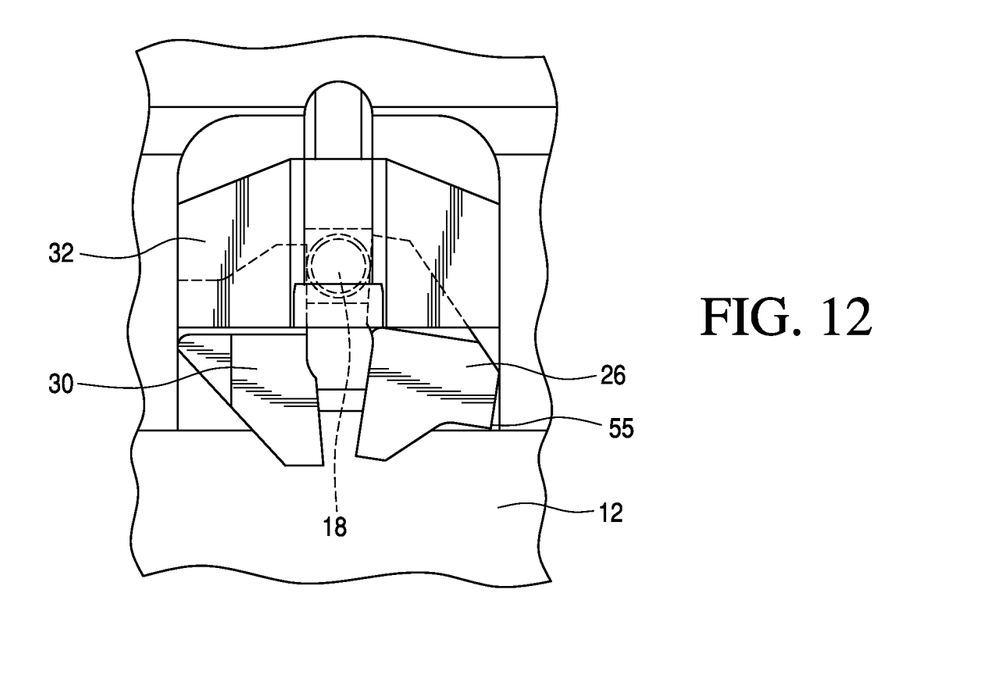
FIG. 12 shows the pin-key having moved a sufficient amount to allow the compression cam to recover slightly, still putting pressure on the pin-key.

In FIG. 12, the pin-key has moved to full 0.18 inches amount allowing the compression cam 26 to recover slightly which is still putting pressure on the pin-key 18 (again, the release distance can be designed as required for the application). The backup still must be supplied from the tension cam 30.

Figure 13:
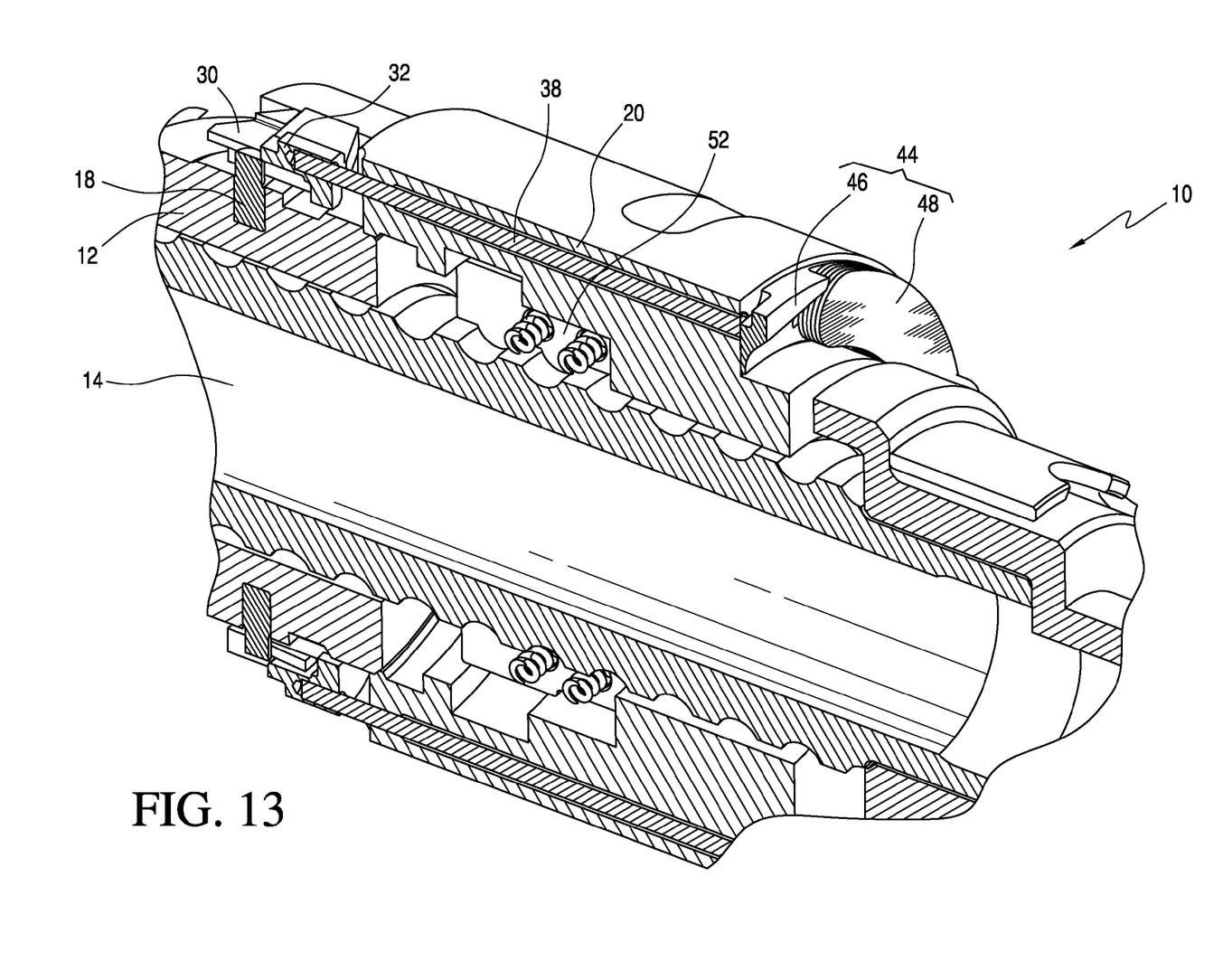
FIG. 13 is a section and perspective view showing how the cam release mechanism is balanced, applying the spring clamping preload force to both sides of the primary nut's pin-keys.

Referring now to FIG. 13, the cam release mechanism is balanced, applying the spring clamping preload force to both sides of the primary nut's pin-keys 18.

Figure 14:
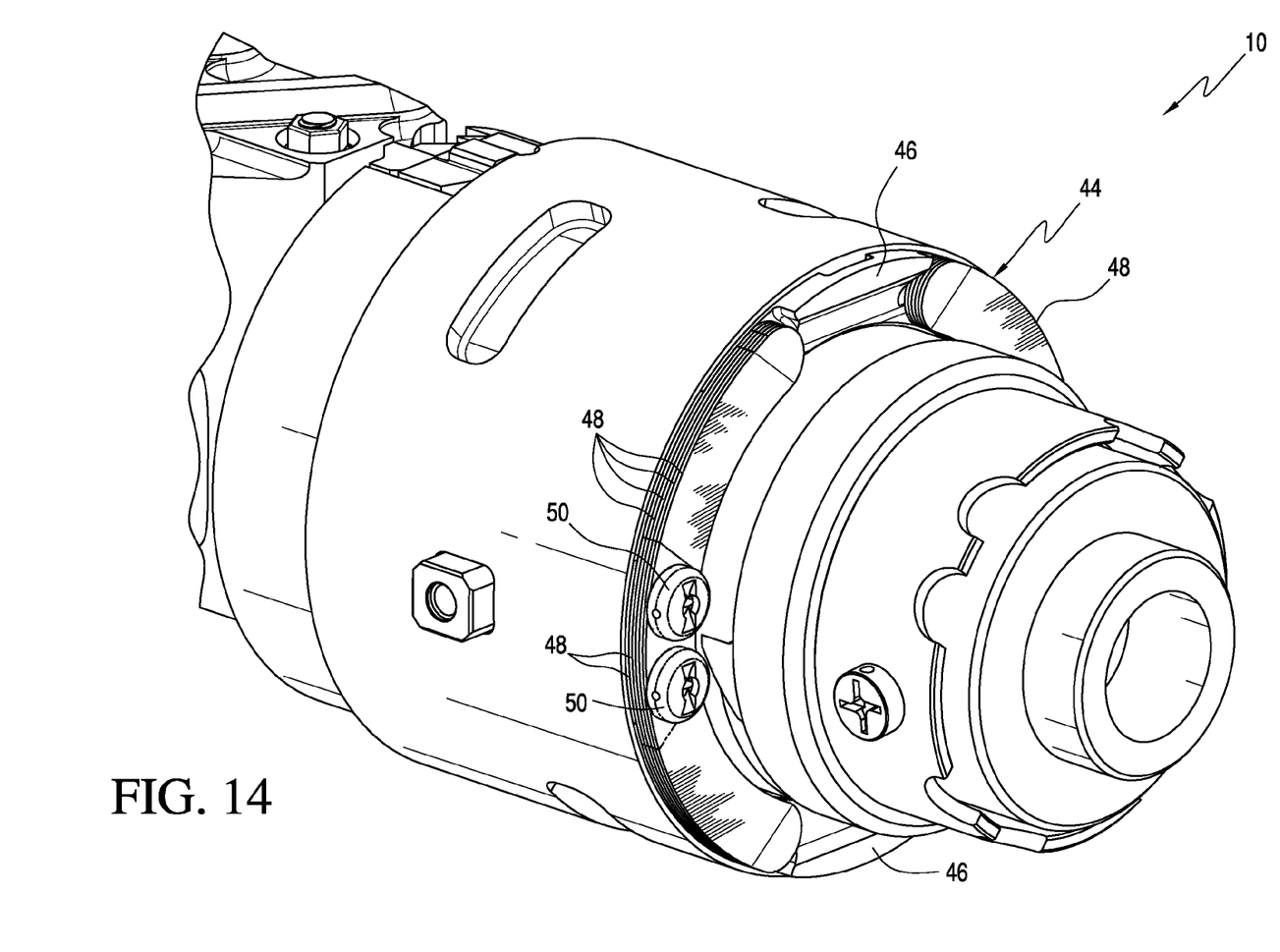
FIG. 14 is a perspective view showing that the leaf spring assembly includes the spring carrier piloted at an end of the secondary load path element backed up by a number of leaf springs.

FIG. 14 illustrates that the leaf spring assembly 44 includes the spring carrier 46 piloted at an end of the secondary load path element 20 backed up by a number of leaf springs 48, all secured by the four wire locked cap screws 50.

Figure 15:
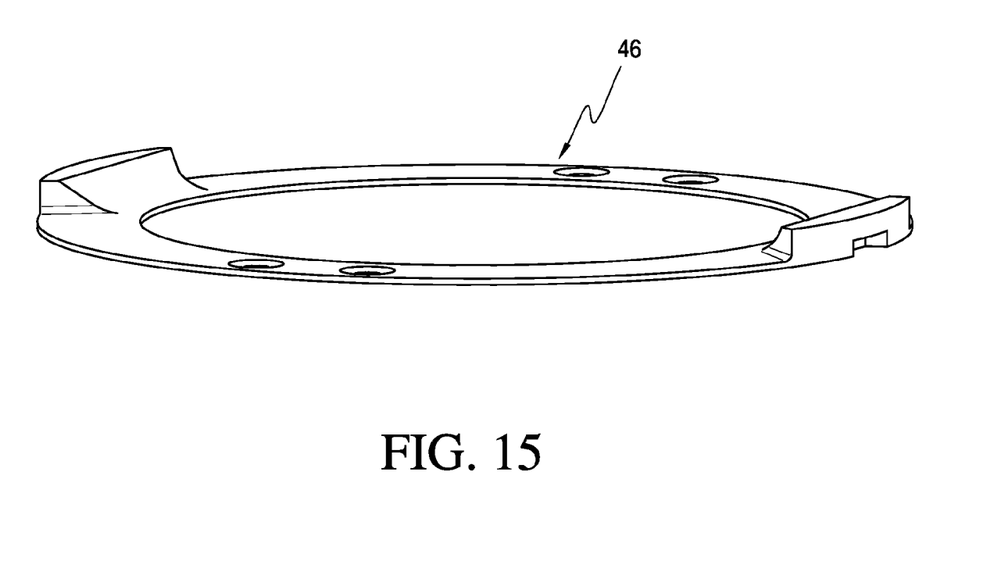
FIG. 15 is a perspective view of the spring carrier.

FIG. 15 illustrates that the main spring (i.e. spring carrier 46) is a circular part, including a thin middle area where the leaf springs 48 nest, and with notches on each end where a tool can be placed to defeat the spring mechanism for test purposes. It may optionally be age hardened in a curved free state to allow a spring pressure when installed (the figure shows a flat part).

Figure 16:
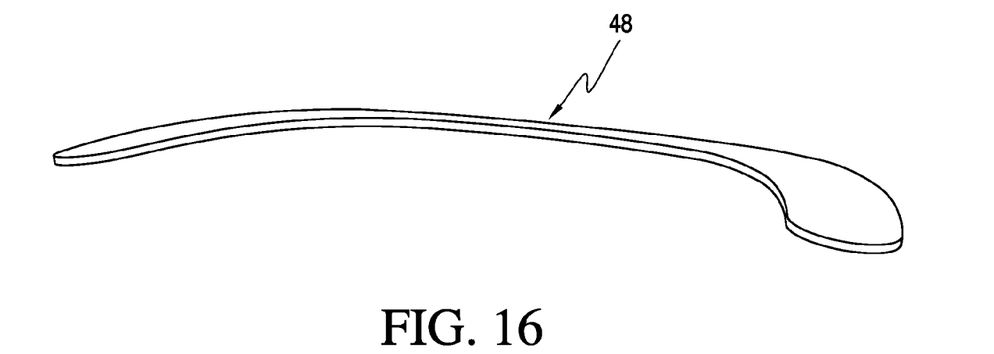
FIG. 16 is a perspective view of a leaf spring in its free state.

FIG. 16 illustrates a leaf spring 48 in its free state. It is preferably age hardened in a curved free state to cause the preload force when installed in the actuator due to its deflection to a flat state (the figure shows the curvature of the free state for this item).

Other embodiments and configurations may be devised without departing from the spirit of the invention and the scope of the appended claims.

The invention claimed is:

1. A centering, release and reset mechanism, comprising:
  a) a primary load path element operatively connected to a positioning structure, said primary load path element having at least one primary load path element slot;
  b) a pin-key positioned within said primary load path element slot arranged and constructed to allow freedom of movement in a rotational direction orthogonal to a positioning direction;
  c) a secondary load path element including at least one secondary load path element slot, a key or spline being positioned between said secondary load path element and said primary load path element;
  d) a compression cam positioned within an opening in said secondary load path element, said opening defining a grooved cam seat for permitting said compression cam to have a defined pivot and stop;
  e) a tension cam positioned within said opening in said secondary load path element, rotation of said tension cam being permitted in the same rotary direction as said compression cam, said tension cam having a defined pivot and stop;
  f) a cam follower resting on respective lobe surfaces of said compression cam and said tension cam, said cam follower having a preload force against rotation against either cam;
  g) a push rod seated in a hole in said cam follower and extending through a respective hole in said secondary load path element;
  h) a leaf spring assembly, comprising:
    i) a spring carrier piloted on an end of said secondary load path element; and,
    ii) a plurality of leaf springs carried by said spring carrier and fastened to said secondary load path element, said leaf springs providing said preload force;
  wherein:
    in a desired, loaded, centered position a preload force from said cam follower is received by said stops on said compression cam and said tension cam, said pin-key being thereby captured and centered in said secondary load path element relative to said primary load path element's slot;
    a failure in a primary load path causes a load to be impressed between said pin-key and one of said cams and if said load is sufficiently high enough to overcome said preload force of said cam follower, then said cam will rotate allowing said pin-key to move in either the tension or compression direction;
    when said primary load path element and said secondary load path element are repositioned back to said centered position, then said cam follower rotates said cam back to its centered reset positions; and,
    said release and reset actions do not require the use of a shear pin.

2. The centering, release and reset mechanism of claim 1, wherein said primary load path element comprises a primary ball nut operatively connected to a primary gimbal positioning a horizontal stabilizer wing or other control structure of an aircraft.

3. The centering, release and reset mechanism of claim 1 wherein said secondary load path element comprises a secondary nut housing of an aircraft control element, said secondary nut housing being positioned such that inverted threads of a secondary inverted nut contained therein are positioned within a space of a ball screw thread of a ball screw, without touching flanks of said ball screw thread, under normal loading conditions while a primary load path of an actuator operatively connected to said ball screw is intact (not failed); and,
  wherein upon the release of said mechanism, due to any tension or compression loading that overcomes said preload force, the release and resulting axial movement initiating loading of said secondary inverted nut causes actuator lockup and primary load path failure detection by the aircraft's electronics.

4. The centering, release and reset mechanism of claim 1, wherein said freedom of movement of said pin-key in said rotational direction allows for a backlash of a rotational key or spline located between said primary load path element and said secondary load path element.

5. The centering, release and reset mechanism of claim 1, wherein said pin-key, said compression cam, said tension cam, said cam follower, said push rod; and, said leaf spring assembly comprise a first set of functional elements,
  wherein said centering, release and reset mechanism further includes a second set of said functional elements positioned 180 degrees apart from said first set, around the axis of said positioning structure.

6. The centering, release and reset mechanism of claim 1, wherein said tension cam and said compression cam are balanced with the same preload force by providing the same distance from each said lobe surface to the cam's center of rotation for both tension and compression cams.

7. A centering, release and reset mechanism for utilization with a horizontal stabilizer wing of an aircraft, comprising:
  a) a primary load path element comprising a primary ball nut operatively connected to a primary gimbal positioning a horizontal stabilizer wing operatively connected to a positioning structure, said primary load path element having at least one primary load path element slot;

b) a pin-key positioned within said primary load path element slot arranged and constructed to allow freedom of movement in a rotational direction orthogonal to a positioning direction;

c) a secondary load path element comprising a secondary nut housing, including at least one secondary load path element slot, a key or spline being positioned between said secondary load path element and said primary load path element;

d) a compression cam positioned within an opening in said secondary load path element, said opening defining a grooved cam seat for permitting said compression cam to have a defined pivot and stop;

e) a tension cam positioned within said opening in said secondary load path element, rotation of said tension cam being permitted in the same rotary direction of said compression cam, said tension cam having a defined pivot and stop;

f) a cam follower resting on respective lobe surfaces of said compression cam and said tension cam, said cam follower having a preload force against rotation against either cam;

g) a push rod seated in a hole in said cam follower and extending through a respective hole in said secondary load path element; and, h) a leaf spring assembly, comprising:
 i) a spring carrier piloted on an end of said secondary load path element; and,
 ii) a plurality of leaf springs carried by said spring carrier and fastened to said secondary load path element, said leaf springs providing said preload force;

wherein:

in a desired, loaded, centered position a preload force from said cam follower is received by said stops on said compression cam and said tension cam, said pin-key being thereby captured and centered in said secondary load path element relative to said primary load path element's slot;

a failure in a primary load path causes a load to be impressed between said pin-key and one of said cams and if said load is sufficiently high enough to overcome said preload force of said cam follower, then said cam will rotate allowing said pin-key to move in either the tension or compression direction;

when said primary load path element and said secondary load path element are repositioned back to said centered position, then said cam follower rotates said cam back to its centered reset positions; and, said release and reset actions do not require the use of a shear pin, and wherein a. said secondary nut housing is positioned such that inverted threads of a secondary inverted nut contained therein are positioned within a space of a ball screw thread of a ball screw, without touching flanks of said ball screw thread, under normal loading conditions while a primary load path of an actuator operatively connected to said ball screw is intact (not failed); and, b. wherein upon the release of said mechanism, due to any tension or compression loading that overcomes said preload force, the release and resulting axial movement initiating loading of said secondary inverted nut causes actuator lockup and primary load path failure detection by the aircraft's electronics.

8. The centering, release and reset mechanism of claim 7, wherein said freedom of movement of said pin-key in said rotational direction allows for a backlash of a rotational key or spline located between said primary load path element and said secondary load path element.

9. The centering, release and reset mechanism of claim 7, wherein said pin-key, said compression cam, said tension cam, said cam follower, said push rod, and, said leaf spring assembly comprise a first set of functional elements,
 wherein said centering, release and reset mechanism further includes a second set of said functional elements positioned 180 degrees apart from said first set, around the axis of said positioning structure.

10. The centering, release and reset mechanism of claim 7, wherein said tension cam and said compression cam are balanced with the same preload force by providing the same distance from each said lobe surface to the cam's center of rotation for both tension and compression cams.

11. A centering, release and reset mechanism, comprising:

a) a primary load path element operatively connected to a positioning structure, said primary load path element having at least one primary load path element slot;

b) a pin-key positioned within said primary load path element slot arranged and constructed to allow freedom of movement in a rotational direction orthogonal to a positioning direction;

c) a secondary load path element including at least one secondary load path element slot;

d) a compression cam positioned within an opening in said secondary load path element, said opening defining a grooved cam seat for permitting said compression cam to have a defined pivot and stop;

e) a tension cam positioned within said opening in said secondary load path element, rotation of said tension cam being permitted in the same rotary direction as said compression cam, said tension cam having a defined pivot and stop;

f) a cam follower resting on respective lobe surfaces of said compression cam and said tension cam, said cam follower having a preload force against rotation against either cam;

g) a spring assembly piloted on an end of said secondary load path element providing said preload force;

wherein:

in a desired, loaded, centered position a preload force from said cam follower is received by said stops on said compression cam and said tension cam, said pin-key being thereby captured and centered in said secondary load path element relative to said primary load path element's slot;

a failure in a primary load path causes a load to be impressed between said pin-key and one of said cams and if said load is sufficiently high enough to overcome said preload force of said cam follower, then said cam will rotate allowing said pin-key to move in either the tension or compression direction;

when said primary load path element and said secondary load path element are repositioned back to said centered position, then said cam follower rotates said cam back to its centered reset positions; and, said release and reset actions do not require the use of a shear pin.

12. The centering, release and reset mechanism of claim 11, wherein said primary load path element comprises a primary ball nut operatively connected to a primary gimbal positioning a horizontal stabilizer wing or other control structure of an aircraft.

13. The centering, release and reset mechanism of claim 11 wherein said secondary load path element comprises a secondary nut housing of an aircraft control element, said secondary nut housing being positioned such that inverted threads of a secondary inverted nut contained therein are positioned within a space of a ball screw thread of a ball screw, without touching flanks of said ball screw thread, under normal loading conditions while a primary load path of an actuator operatively connected to said ball screw is intact (not failed); and,     wherein upon the release of said mechanism, due to any tension or compression loading that overcomes said preload force, the release and resulting axial movement initiating loading of said secondary inverted nut causes actuator lockup and primary load path failure detection by the aircraft's electronics.

14. The centering, release and reset mechanism of claim 11, wherein said freedom of movement of said pin-key in said rotational direction allows for a backlash of a rotational key or spline located between said primary load path element and said secondary load path element.

15. The centering, release and reset mechanism of claim 11, wherein said tension cam and said compression cam are balanced with the same preload force by providing the same distance from each said lobe surface to the cam's center of rotation for both tension and compression cams.

\* \* \* \* \*